United States Patent
Meier-Kaiser

(10) Patent No.: US 6,368,098 B2
(45) Date of Patent: *Apr. 9, 2002

(54) APPARATUS FOR THE CALIBRATION OF HOLLOW CHAMBER SHEET EXTRUDED LINES

(75) Inventor: Michael Meier-Kaiser, Alsbach-Hähnlein (DE)

(73) Assignee: Roehm GmbH Chemische Fabrik, Darmstadt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,987

(22) Filed: Feb. 4, 1999

(30) Foreign Application Priority Data

Feb. 4, 1998 (DE) .......................... 198 04 235

(51) Int. Cl.⁷ ..................... B29C 35/16; B29C 47/90
(52) U.S. Cl. ................... 425/388; 264/568; 264/571; 425/405.1
(58) Field of Search ............... 264/210.2, 568, 264/566, 571; 425/71, 73, 86, 188, 190, 445, 388, 387.1, 326.1, 392, 405.1

(56) References Cited

U.S. PATENT DOCUMENTS 3,274,313 A * 9/1966 Harp, Jr.
3,795,471 A * 3/1974 Milani .................... 425/388
4,124,344 A * 11/1978 Kiyono et al. ........... 425/174.4
4,329,314 A * 5/1982 Jackson et al. ............. 264/519
4,508,500 A * 4/1985 French .................... 425/388
4,707,393 A * 11/1987 Vetter ..................... 428/178
5,340,295 A   8/1994 Preiato et al. ............. 425/77
5,607,638 A * 3/1997 Cadwell
5,645,861 A   7/1997 Czarnik et al. ............. 425/7
5,807,516 A   9/1998 Wolstenholme et al. . 264/210.2

FOREIGN PATENT DOCUMENTS

DE    2 062 378     6/1972
FR    2386408      11/1978

OTHER PUBLICATIONS

Patent Abstracts of Japan, vol. 010, No. 191 (M 495), Jul. 4, 1972, JP 61 035928, Feb. 20, 1986.

* cited by examiner

Primary Examiner—Mark Eashoo
(74) Attorney, Agent, or Firm—Oblon, Spivak, McClelland, Maier & Neustadt, P.C.

(57) ABSTRACT

An apparatus for calibrating hollow chamber sheet extruded lines out of thermoplastic resin includes a vacuum housing and a planar intake area at a first end of the vacuum housing. The planar intake area is configured to receive the extruded line. Support rollers within the vacuum housing are configured to support the extruded line. The extruded line exits the vacuum housing through a planar outlet area located at a second end of the vacuum housing opposite the first end.

6 Claims, 2 Drawing Sheets

APPARATUS FOR THE CALIBRATION OF HOLLOW CHAMBER SHEET EXTRUDED LINES

BACKGROUND OF THE INVENTION

1. Field of the Invention

The present invention relates to a device for calibrating extruded lines from hollow chamber sheets formed of thermoplastic resin. The present invention also relates to hollow chamber sheets that have been manufactured on an extruder with the inventive calibration device.

2. Discussion of the Background

DE-C 32 44 953 and EP-B 158 951 describe vacuum mold channels which are used to calibrate hollow chamber profiles out of thermoplastic resin. These documents disclose that single piece extruded hollow chamber profiles are guided through a channel of two cooling plates that are equipped with vacuum channels. Sinking of the hollow chamber profile due to gravitational forces during the cooling phase is counteracted by a supporting force resulting from the difference in pressure between the interior and exterior of the hollow chamber profile.

DE 3 526 752 describes a procedure and an apparatus for the production of hollow chamber sheets out of resin. In this procedure, the upper and lower flanges are extruded and then bonded with prefabricated fins. The upper and lower flanges are taken in and cooled with the help of vacuum calibrators. This procedure offers the benefit of being able to achieve any fin design and combine various resins on the hollow chamber profiles.

DE-U 9 014 958 describes a procedure and an apparatus for the extrusion of hollow chamber sheets out of thermoplastic resin. In this procedure, the flanges and the fins of the profile are extruded separately and then welded to each other while they are still in their thermoplastic condition. This is done to prevent sink marks that can occur due to thermal contraction of the fins during the cooling phase, particularly in the case of single piece extrusion. The hollow chamber sheet profile obtained this way is immediately guided through a calibration device with an upper and a lower endless belt which preferably consists of metal. The cooling plates, which are located above or below the endless belts and through which coolant flows, serve to release heat. In order to maintain good contact between the endless belts and the cooling plates and to guide the endless belts at an established and even distance, the cooling plates can be equipped with vacuum channels via which the endless belts are taken in. This calibration method has the disadvantage that the hollow chamber profile is not supported by vacuum forces against gravity related sinking so that the method cannot be used on single piece extruded hollow chamber profiles.

Common vacuum calibration devices, where frictional forces occur between the extruded surface and the cooled metal plates of the calibration device (which also have vacuum openings), have a variety of disadvantages. Particularly on scratch-sensitive resins, the gliding of the extruding surface during calibration may cause the extruded surface to become scratched. Scratching of the extruded surface may lead to other problems if the abrasions accumulate.

The change between sticking and gliding ("stick-slip") between the extrudate (i.e., the extruded surface) and the calibration device leads to an uneven draw of the extrudate. As a consequence of the uneven draw, fluctuations in the thickness of the extrudate in the extrusion direction may occur. These fluctuations may cause noticeable waviness on the hollow chamber profile. This waviness impairs the transparency of fin plates formed out of the transparent resin.

Cooling related to shrinkage of the fins when the fin plate runs through the calibration process (and also due to the pressure of the upper and lower flanges on the calibration surface) can lead to the formation of sink marks in the area of the fins. The sink marks become more distinct when the temperature difference of the fins between entering and exiting calibration increases. The sink marks also become more distinct if the negative pressure becomes lower and if the fins become thicker.

High negative pressure, which is desired for good thermal transmission between calibration and the strap surface and for avoiding sink marks, leads to high draw forces due to the frictional forces between the calibration device and the extrudate. In extreme cases, high draw forces can cause the extrudate to rupture between the calibration device and the drawing equipment.

The drawing rollers can also slip on the extrudate surface. This slipping may cause the extrusion process to collapse. In order to avoid such slipping, even at high negative pressure, complex multi-roller designs are required.

Too large a temperature difference can lead to the formation of internal stresses in the extrudate. Thus, the drawing speed that can be achieved with dry vacuum calibration is limited by the maximum allowable temperature difference between the temperature of the extrudate when exiting the extrusion die and temperature of the extrudate when exiting the calibration device. An extension of the calibration device as an alternative to increase the drawing speed is also problematic due to rising draw forces.

SUMMARY OF THE INVENTION

Accordingly, one object of the invention is to provide a novel and improved apparatus and method for the calibration of hollow chamber sheet extruded lines formed of thermoplastic resin.

Another object of the invention is to provide an apparatus and method for calibrating extruded lines in which frictional forces on the extruded line are minimized.

These and other objects are achieved according to the present invention by providing an apparatus for the calibration of hollow chamber sheet extruded lines. The apparatus includes a vacuum housing and a planar intake area at a first end of said vacuum housing. The planar intake area is configured to receive the extruded line. Support rollers within said vacuum housing are configured to support said extruded line. Said extruded line exits said vacuum housing through a planar outlet area located at a second end of said vacuum housing opposite said first end.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
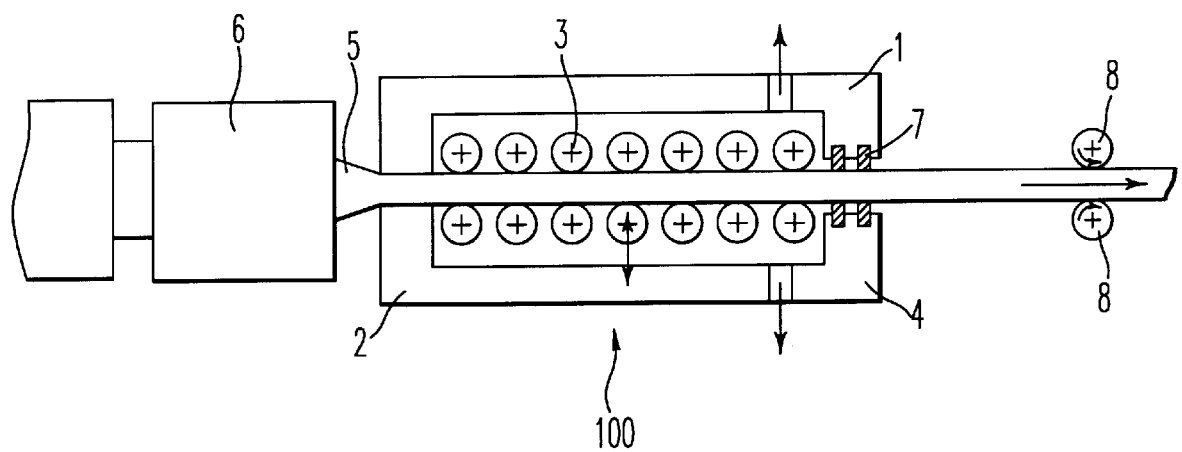
FIG. 1 is an illustration of an inventive apparatus for calibrating hollow chamber sheet extrudate.

Referring now to the drawings, wherein like reference numerals designate identical or corresponding parts throughout the several views, and more particularly to FIG. 1 thereof, a calibrating device 100 is located a short distance behind an extrusion die that is fed by an extruder. The calibrating device includes a vacuum housing 1 which has a planar intake area 2, support rollers 3, and a planar outlet area 4. The intake area 2, the support rollers 3, and the outlet area 4 form a channel through which the extruded hollow chamber sheet extruded line is pulled, supported, and cooled. A drawing device, such as a pair of drawing rollers 8, creates a tensile force in the extruded line. It is also possible, however, to equip the support rollers 3 with a drive, with both a drive and the structure described above, and/or with any suitable device for drawing the extruded line.

The planar intake area 2 serves the purpose of cooling the outer surfaces of the extruded line to below its distortion temperature. An extruded line formed out of polymethylmethacrylate resin, for example, exits the extrusion die at a temperature of 260° C. (500° F.) but is cooled to about 110° C. (230° F.) by the planar intake area 2. Further, the planar intake area 2 serves the purpose of sealing the housing 1 from the environment so that a negative pressure can be maintained in the housing 1.

At least in the upper area, it must be possible to evacuate the housing 1 to avoid a sinking of the hollow chamber sheet profile (e.g., a fin double plate) due to the weight of the upper flange and the fins. For this purpose, a relatively low negative pressure of 10 to 100 Pa, for example, is sufficient. Also, the lower half facing the extrudate bottom is evacuated to safely avoid the formation of sink marks due to cooling related contraction of the fins.

The support rollers 3 are arranged above and beneath the channel for the extruded line. They support the extruded hollow chamber sheet line against the negative pressure on the housing. Advantageously, the support rollers 3 can be adjusted in height relative to the vacuum housing 1. This offers the benefit of being able to adjust the support for the extrudate surface in exact accordance with the shrinkage of the fins throughout the progressive cooling process.

Cooling of the extrudate surface occurs through a cooling of the support rollers 3, through spray cooling of the extrudate surface, or by flooding the entire housing 1 with water (wet calibration). Under certain circumstances, cooling of the housing 1 and thermal transfer through radiation and convection may be sufficient.

The planar outlet area 4, similar to the planar intake area 2, serves to seal the calibration device. The height of the planar outlet area 4 can be adjusted relative to the vacuum housing 1, if necessary, or equipped with flexible sealant strips 7. The flexible sealant strips 7 are formed of any temperature-resistant resin with good gliding properties such as polytetrafluoroethylene (PTFE), for example.

Figure 2:
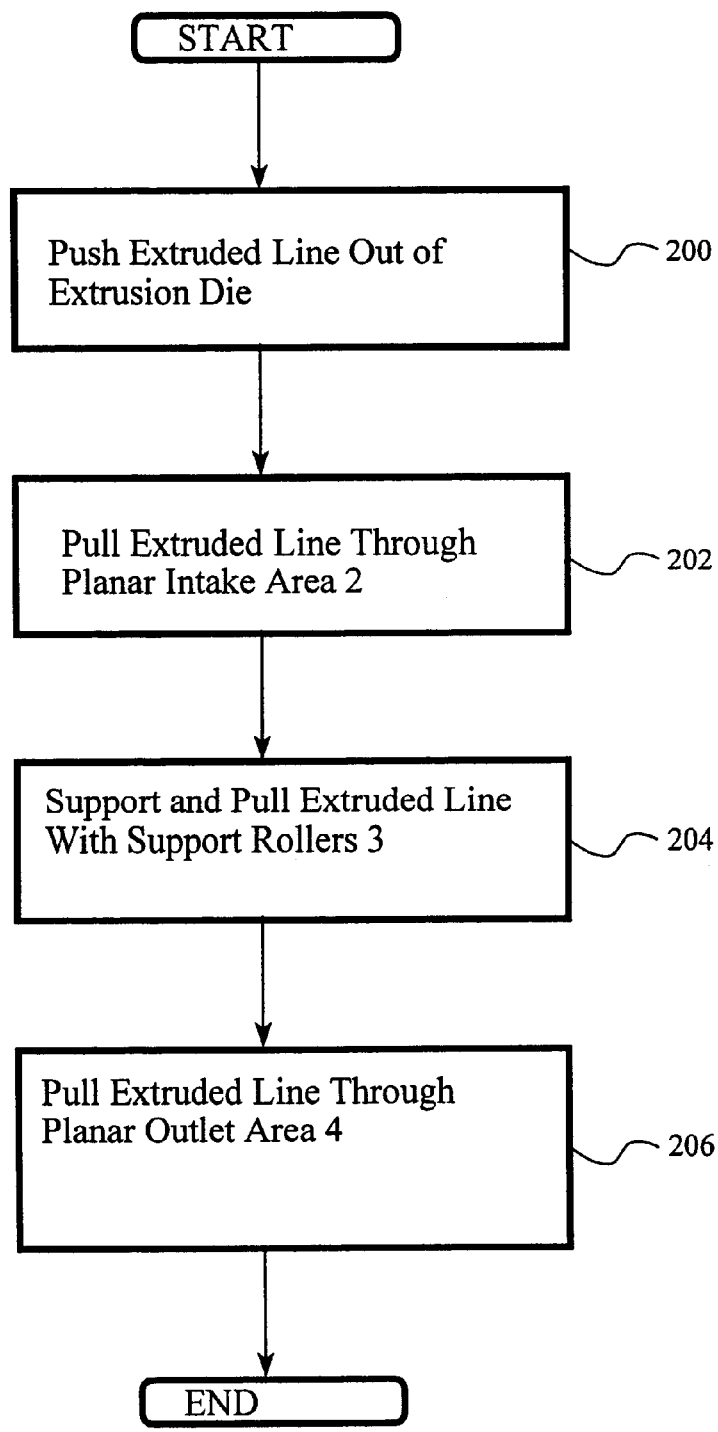
FIG. 2 is a flowchart describing the inventive process for calibrating hollow chamber sheet extrudate.

Referring now to FIG. 2, a flowchart describing the inventive method is shown. In step 200, a hollow chamber sheet extruded line 5 formed of thermoplastic resin is pushed out of an extrusion die 6. In step 202, the extruded line 5 is pulled through the planar intake area 2. In step 204, the extruded line is supported by and pulled between the support rollers 3. In step 206 the extruded line 5 is pulled through the planar outlet area 4 with flexible gaskets 7. A drawing device such as the drawing rollers 8 may be used to pull the extruded line 5 through the vacuum housing 1 of the calibration device.

On an extruder that is equipped with a calibration device in accordance with the invention, high-quality hollow chamber sheets formed out of thermoplastic resin can be produced.

The calibration fixture according to the invention is basically suited for hollow chamber sheets and resins of all types. Particular benefits result from multiple fin plates and double fin plates formed out of polymethylmethacrylate, polycarbonate, or other transparent resins. In this manner, better transparency of the hollow chamber profiles is achieved since scratching of the profile surface is avoided. Additionally, wavy thickness fluctuations on the flange are largely avoided. Such fluctuations lead to an undesirable deflection of penetrating rays of light due to lens flare. Also, the calibration device can be adjusted randomly in its measurements to fit all extruders or all hollow chamber sheet extrusion dies.

Due to the low frictional forces in the calibration device, the necessary draw forces are also comparatively small. This makes it possible to produce fin plates with few or very thin fins, which resist only low draw forces. By avoiding gliding processing techniques, damage to the extrudate surface is prevented. Further, the disadvantageous changes between sticking and gliding ("stick-slip") of common vacuum calibration fixtures does not occur. Moreover, the hollow chamber sheets that are produced are nearly free of waviness and sink marks in the area of the fins. Due to overall low frictional forces in the calibration device, it is possible to achieve equipment layouts that are considerably longer than those conventionally utilized.

Obviously, numerous modifications and variations of the present invention are possible in light of the above teachings. It is therefore to be understood that within the scope of the appended claims, the invention may be practiced otherwise than as specifically described herein.

The present application is based on German Patent Application 198 04 235.3, filed Feb. 4, 1998. German Patent Application 198 04 235.3 and all reference cited therein are hereby incorporated by reference in their entirety.

What is claimed is:

1. An apparatus for calibrating a hollow chamber sheet extruded line formed out of thermoplastic resin, comprising:
   a vacuum housing;
   a planar intake area at a first end of said vacuum housing, said planar intake area being configured to receive an extruded line;
   support rollers within said vacuum housing configured to support said extruded line, wherein the support rollers comprise opposed row of pairs on opposite sides; and
   a planar outlet area through which said extruded line exits said vacuum housing, said planar outlet area being located at a second end of said vacuum housing opposite said first end.

2. The apparatus according to claim 1, wherein said support rollers are configured to be adjustable in height relative to the vacuum housing.

3. The apparatus according to claim 1, further comprising: means for cooling the support rollers.

4. The apparatus according to claim 1, further comprising: a drive configured to turn said support rollers.

5. The apparatus according to claim 1, wherein the planar outlet area comprises:
   flexible sealant strips formed of a thermally resistant resin.

6. The apparatus according to claim 1, wherein the planar intake area is configured to seal the vacuum housing, and wherein the planar outlet area is configured to seal the vacuum housing.

* * * * *